US008559600B2

(12) United States Patent
Okamoto et al.

(10) Patent No.: US 8,559,600 B2
(45) Date of Patent: Oct. 15, 2013

(54) X-RAY WAVEGUIDE

(75) Inventors: Kohei Okamoto, Yokohama (JP); Atsushi Komoto, Moriya (JP); Wataru Kubo, Inagi (JP); Hirokatsu Miyata, Hadano (JP); Takashi Noma, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 13/112,093

(22) Filed: May 20, 2011

(65) Prior Publication Data

US 2011/0299661 A1 Dec. 8, 2011

(30) Foreign Application Priority Data

Jun. 2, 2010 (JP) ................................. 2010-127337
Apr. 28, 2011 (JP) ................................. 2011-101308

(51) Int. Cl.
*G21K 1/00* (2006.01)
*G02B 6/028* (2006.01)
*G02B 6/036* (2006.01)

(52) U.S. Cl.
USPC .......................................... 378/145; 385/126

(58) Field of Classification Search
USPC . 378/145, 156, 140, 204, 210; 385/123–128, 385/141–145, 147; 356/460, 477, 73.1
See application file for complete search history.

(56) References Cited

U.S. PATENT DOCUMENTS 4,205,329 A * 5/1980 Dingle et al. ................... 257/17
2011/0129065 A1 6/2011 Komoto et al. ................. 378/84
2011/0299662 A1 12/2011 Okamoto et al. ............. 378/145

FOREIGN PATENT DOCUMENTS

JP 2005-246369 9/2005
JP 2005-258406 9/2005

OTHER PUBLICATIONS

I. R. Prudnikov, "X-Ray Waveguides Based on Bragg Scattering of Multilayers", *Physical Review B*, vol. 67, Issue 23, pp. 233303-1 through 233303-4 (2003).

A. Jarre et al., "X-Ray Waveguide Nanostructures: Design, Fabrication, and Characterization", *Journal of Applied Physics*, vol. 101, Issue 5, p. 054306 (2007).

* cited by examiner

*Primary Examiner* — Anastasia Midkiff
(74) *Attorney, Agent, or Firm* — Fitzpatrick, Cella, Harper & Scinto

(57) ABSTRACT

An X-ray waveguide according to the present invention includes: a core for guiding an X-ray in such a wavelength band that a real part of the refractive index of a material is 1 or less; and a cladding for confining the X-ray in the core, wherein: the cladding has a periodic structure in which multiple materials having different real parts of the refractive index are periodically arranged in two-dimensional directions perpendicular to the guiding direction of X-ray; and the periodic structure has a period of 100 nm or less.

11 Claims, 5 Drawing Sheets

X-RAY WAVEGUIDE

BACKGROUND OF THE INVENTION

1. Field of the Invention

The present invention relates to an X-ray waveguide, and more specifically, to an X-ray waveguide to be used in an X-ray optical system for an X-ray analysis technology, an X-ray imaging technology, an X-ray exposure technology, or the like.

2. Description of the Related Art

When an electromagnetic wave having a short wavelength of several ten nanometers or less is dealt with, a difference in refractive index for any such electromagnetic wave between different materials is extremely small, specifically, $10^{-5}$ or less. Hence, the critical angle for total reflection also becomes extremely smaller. In view of the foregoing, a large-scale spatial optical system has been used for controlling such electromagnetic wave including an X-ray, and has still been in the mainstream now. As main parts for forming the spatial optical system, there is given a multilayer mirror obtained by alternately laminating materials having different refractive indices, and the multilayer mirror is playing various roles such as beam shaping, spot size conversion, and wavelength selection.

A conventional X-ray waveguide such as a polycapillary propagates, in contrast to such spatial optical system, which has been in the mainstream, an X-ray by confining the X-ray in itself. Researches have been recently conducted on an X-ray waveguide, which propagates an X-ray by confining the X-ray in a thin film or a multilayer film, with a view to reducing the size and improving the performance of an optical system. Specifically, researches have been conducted on, for example, a thin-film waveguide having such a shape in which a waveguiding layer is interposed between two layers of one-dimensional periodic structures (Physical Review B, Volume 67, Issue 23, p. 233303 (2003)) and an X-ray waveguide having such a shape in which an X-ray is confined in multiple adjacent waveguide structures by total reflection before the X-ray is guided (Journal Of Applied Physics, Volume 101, Issue 5, p. 054306 (2007)). In addition, it has been proposed that a waveguide structure is formed with a material, which has an artificially changed refractive index, by providing the inside of a semiconductor such as silicon with a random air pore region through an anodization step (Japanese Patent Application Laid-Open No. 2005-258406).

In Japanese Patent Application Laid-Open No. 2005-258406, however, the following material such as a porous silicon is used in a cladding. Random air pores are formed in the material so that the material may have a relatively reduced electron density as compared with that of a waveguiding region (core) for guiding an electromagnetic wave. As a result, the refractive index of the core for an X-ray becomes relatively small as compared with that of the cladding. Therefore, with the configuration, it is difficult to guide the X-ray by confining the X-ray in the core.

In addition, Journal Of Applied Physics, Volume 101, Issue 5, p. 054306 (2007), only total reflection at an interface between a core and a cladding is used as means for confining an X-ray in the core. Accordingly, there arises such a problem that the selectivity of materials is limited and the range of designs narrows. The foregoing is interpreted as described below. As a the critical angle for total reflection at the interface between the core and the cladding depends only on a characteristic of a material, set values for the structure parameters of the waveguide such as a waveguide width must each fall within a narrow range in, for example, the case where a specific mode is to be guided. In addition, when only the total reflection is used, individual structure errors such as instabilities at the time of production present at the interface between the core and the cladding, and further, in the core and the cladding, the unavoidable discontinuity of the interface, and a crack cause serious reductions in propagation characteristics such as a reduction in transmittance and the deterioration of a waveguide mode. Further, when an X-ray is guided by using only the total reflection, the waveguide mode itself also depends only on the material and a structure determined by the material, and hence the mode is hard to control freely. In contrast, the configuration in Physical Review B, Volume 67, Issue 23, p. 233303 (2003) is such that an X-ray is confined in a core by using not only total reflection but also Bragg reflection at a cladding formed of a one-dimensional periodic structure obtained by alternately laminating two kinds of materials having different refractive indices in the direction perpendicular to a surface plane of substrate. However, the one-dimensional periodic structure exerts its effect almost only in the direction perpendicular to a substrate surface, and cannot exert the effect in a direction parallel to the substrate surface. Accordingly, there arises such a problem that it is extremely difficult to control a mode parallel to the surface or waveguiding direction. Waveguiding direction means the guiding direction of X-ray of a waveguide mode.

SUMMARY OF THE INVENTION

The present invention has been made in view of such background art, and provides an X-ray waveguide having high selectivity of its components and capable of efficiently guiding an X-ray.

An aspect of the present invention is an X-ray waveguide including: a core for guiding an X-ray in such a wavelength band that a real part of the refractive index of a material is 1 or less; and a cladding for confining the X-ray in the core, wherein: the cladding has a periodic structure in which multiple materials having different real parts of the refractive index are periodically arranged in two-dimensional directions perpendicular to the guiding direction of X-ray; and the periodic structure has a period of 100 nm or less.

Further aspects of the present invention will become apparent from the following description of exemplary embodiments with reference to the attached drawings.

According to the present invention, there can be provided an X-ray waveguide having high selectivity of its components and capable of efficiently guiding an X-ray.

DESCRIPTION OF THE EMBODIMENTS

Figure 1A:
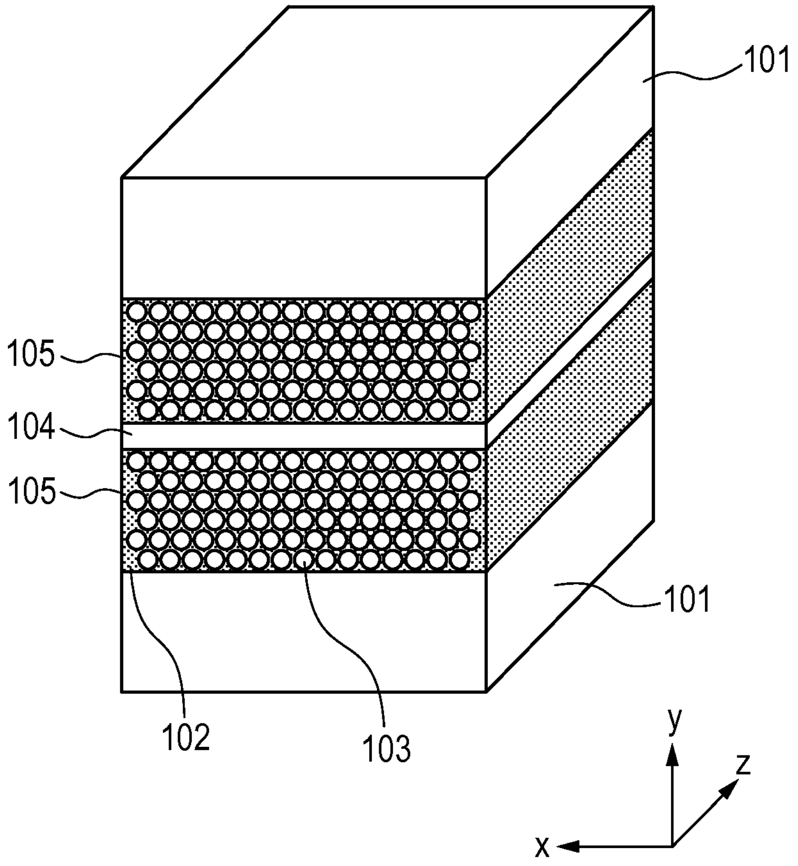
FIG. 1A is an explanatory diagram illustrating an X-ray waveguide of Example 1 of the present invention.

Hereinafter, the present invention is described in detail.

The term "X-ray" used herein refers to X-rays in such a wavelength band that the real part of the refractive index of a material is 1 or less. Specifically, the term "X-ray" used herein refers to electromagnetic waves each having a wavelength of 100 nm or less including extreme ultraviolet (EUV) light. Further, the following fact has been known. As an electromagnetic wave having such short wavelength has so high a frequency that an electron in the outermost shell of a material cannot respond to the frequency, the real part of the refractive index of the material for an X-ray is smaller than 1 unlike the frequency band of an electromagnetic wave (visible light or infrared light) having a wavelength equal to or longer than that of ultraviolet light. As represented in the following formula (1), such refractive index n of a material for an X-ray is generally represented by using a shift amount $\delta$ of a real part from 1 and an imaginary part $\beta'$ related to absorption.

$$N=1-\delta-i\beta'=n'-\alpha' \quad (1)$$

As the $\delta$ is proportional to an electron density $\rho_e$ of the material, the real part of the refractive index reduces as the electron density of the material increases. Further, the $\rho_e$ is proportional to an atomic density $\rho_a$ and an atomic number Z. As described above, the refractive index of a material for an X-ray is represented in terms of a complex number. In the specification, the real part of the complex number is referred to as a "refractive index real part" or a "real part of the refractive index," and the imaginary part of the complex number is referred to as a "refractive index imaginary part" or an "imaginary part of the refractive index."

The case where a real part of the refractive index for an X-ray becomes maximum is the case where the X-ray propagates in a vacuum. However, under a general environment, the real part of the refractive index of air for nearly all materials except gases becomes maximum. In the specification, the term "material" is applied to a vacuum as well. That is, in the present invention, two or more kinds of materials having different real parts of the refractive index can be interpreted as two or more kinds of materials having different electron densities approximately. In the frequency band of the X-ray as well, the behavior of the X-ray follows Maxwell's equations in many cases. Accordingly, the reflection and refraction of the X-ray occur at the interface between the two materials having different real parts of the refractive index. Even when a periodic structure is formed of those materials, the reflection and refraction repeatedly occur, and hence multiple interference occurs in the periodic structure. As a result, Bragg reflection or a photonic band gap effect is exerted. The minimum unit structure that forms the periodic structure is referred to as a "unit structure" in the specification. The periodic structure that forms a core has a two-dimensional periodicity in a plane perpendicular to a waveguiding direction, in other words, in a plane perpendicular to an interface between a cladding and the core. Waveguiding direction means the guiding direction of X-ray of specific waveguide mode, which is parallel to the direction of propagation constant of the waveguide mode.

Figure 2:
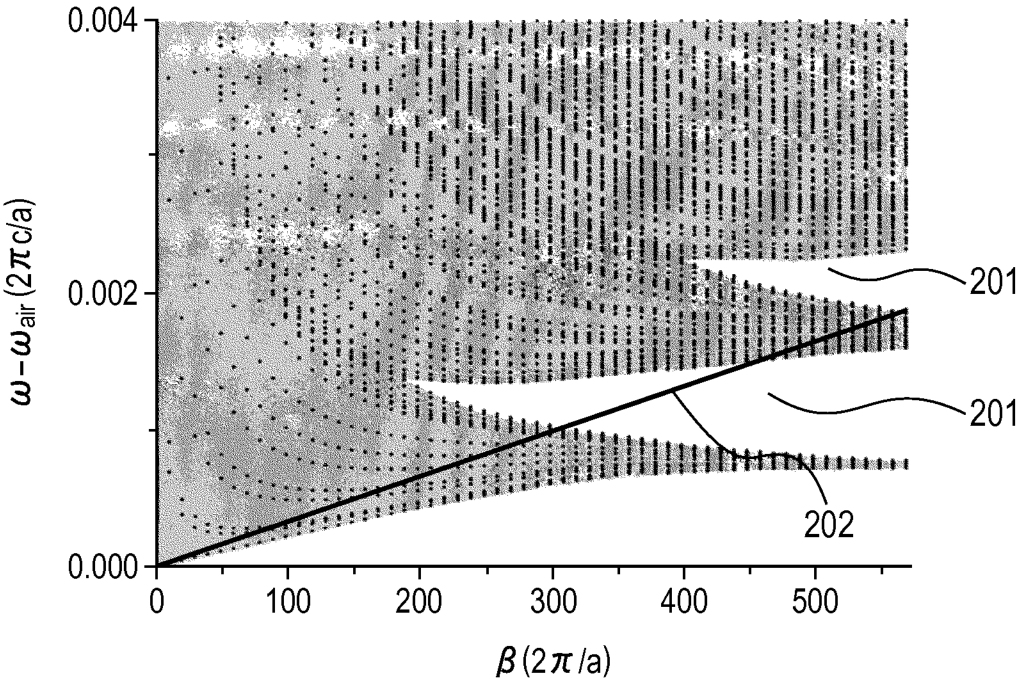
FIG. 2 is a diagram illustrating a photonic band diagram.

FIG. 2 illustrates the results of the calculation of the photonic band diagram of a mesoporous silica 303 (FIG. 3) as a material having infinitely elongating air pores 301 two-dimensionally arranged in triangular lattice fashion in $SiO_2$ 302. Only the real part of the refractive index of $SiO_2$ is used in the calculation, and a waveguiding direction is defined to be parallel to the lengthwise direction of each air pore. A material in each air pore is air. The calculation is performed by defining the real part of the refractive index of air as 1, and the imaginary part of the refractive index of air is not used in the calculation. FIG. 2 illustrates a dispersion relationship that draws a value obtained by subtracting a frequency $\omega_{air}$ on a light line of air from a normalized frequency $\omega$ of an X-ray on the axis of ordinate and a normalized propagation constant $\beta$ (wave vector in the waveguiding direction) on the horizontal axis. Black dots in the figure are the results of the calculation representing modes that can exist in the material. The $\beta$ is a propagation constant in a direction parallel to a waveguiding direction, and the light line is obtained by plotting the results of calculation representing a linear dispersion relationship (formula 2) between the normalized frequency $\omega$ and the normalized propagation constant $\beta$. As the real part of the refractive index n' is larger, the gradient of the light line becomes smaller. It should be noted that a and c in FIG. 2 represent a lattice constant (period) and the speed of light, respectively.

$$\omega=\beta=\frac{\beta_0}{n'} \quad (2)$$

In other words, reference numeral 202 in the figure represents the light line of $SiO_2$, and the light line of air corresponds to $\omega-\omega_{air}=0$, i.e., coincides with horizontal axis. In the figure, a region filled with a gray color represents X-ray modes that can exist in the material. In this case, $\beta_0$ represents a propagation constant in a vacuum.

In FIG. 2, a region where no mode exists is observed as represented by reference numeral 201. Such region is referred to as a "photonic band gap." An X-ray having a frequency and a propagation constant each corresponding to the photonic band gap cannot exist in the material, and as a result, is reflected, which is a photonic band gap effect. A large number of materials including Si, Be, and other materials on the periodic table, and various materials including organic materials, compounds, and oxides such as $SiO_2$, $TiO_2$, and $SnO_2$ can each be utilized as such material that forms the periodic structure, and the material is selected depending on, for example, the wavelength of an X-ray to be dealt with and a needed waveguide mode of the X-ray.

When the periodic structure is a two-dimensional structure, the periodic structure is a triangular lattice structure or the like. When the periodic structure is a three-dimensional structure, the periodic structure is a hexagonal close-packed (face-centered cubic lattice) structure or the like. Accordingly, the Bragg reflection or the photonic band gap effect is exerted two- or three-dimensionally when the periodic structure that forms at least part of the cladding is a two- or three-dimensional structure. As a result, the propagation mode of the X-ray formed in the core, which is the waveguide mode can be controlled two- or three-dimensionally. In addition, the X-ray undergoes multiple interference in the periodic structure because the X-ray is confined in the core. As a result, an electricmagnetic field distribution (profile) averaged by a structure that covers a broad region is formed. Therefore, reductions in propagation characteristics of the X-ray due to, for example, individual structure errors and production errors of local regions that are of concern in total reflection can be suppressed. The periodic structure of the cladding is formed of preferably a mesostructured material, more preferably a mesoporous material. In addition, the periodic structure of the cladding is preferably formed of an arrangement of spheres of any material.

Figure 1B:
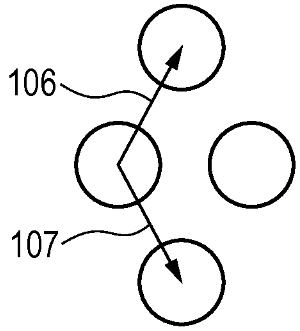
FIG. 1B is a view illustrating the unit structures of air pores arranged in a triangular lattice fashion.

In the present invention, the period of the two- or three-dimensional periodic structure is preferably 200 nm or less. Although an optimum period varies depending on the photon energy or wavelength of an X-ray to be dealt with, the period of the two- or three-dimensional periodic structure is desirably 10 nm or more when an X-ray having a photon energy of, for example, about 8 kilo-electron volts (keV) is used. A period in excess of 200 nm is not preferred because of the following reasons. The core region of the waveguide basically becomes so large for an X-ray that a clear waveguide mode is hard to form. In addition, even when the waveguide mode is formed, the mode is present in a state of being mixed with an extremely large number of high-order modes. It should be noted that the period of the periodic structure is defined by the absolute values of the respective fundamental vectors connecting the symmetry points of the unit structures that form the periodic structure. In the case of the two-dimensional periodic structure, two fundamental vectors can define the structure. In the case of the three-dimensional periodic structure, three fundamental vectors can define the structure. For example, FIG. 1B illustrates the unit structures of air pores arranged in a triangular lattice fashion to serve as the periodic structure in an X-ray waveguide of FIG. 1A. In FIG. 1A, the waveguiding direction is parallel to z-direction. In FIG. 1B, circles represent the air pores, and reference numerals 106 and 107 each represent a fundamental vector. In this case, the period is the absolute value of each of the fundamental vectors 106 and 107 because the absolute values of the fundamental vectors 106 and 107 are equal to each other. It should be noted that in the present invention, a periodicity in the direction perpendicular to the interface between the cladding and the core is most important when an X-ray is confined in the core by the periodicity of the periodic structure of the cladding. In the example of FIGS. 1A and 1B, y-direction corresponds to the foregoing direction, and the period in the direction is obtained by multiplying the absolute value of the fundamental vector 106 or 107 by cos(30°).

Figure 4:
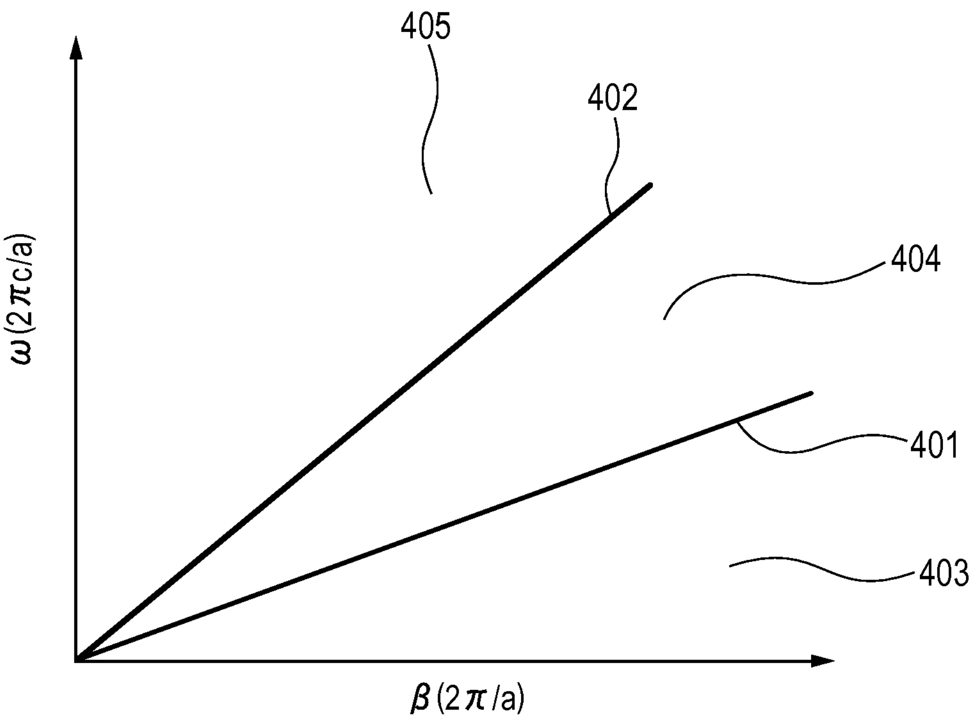
FIG. 4 is a diagram illustrating a dispersion relationship.

FIG. 4 illustrates a schematic view of a photonic band diagram when the periodic structure that forms part of the cladding is formed of two materials having different electron densities. A light line 401 is drawn for a first material as one of the two materials, and a light line 402 is drawn for a second material as the other material. The diagram corresponds to the case where the real part of the refractive index of the first material is larger than the real part of the refractive index of the second material.

Figure 5:
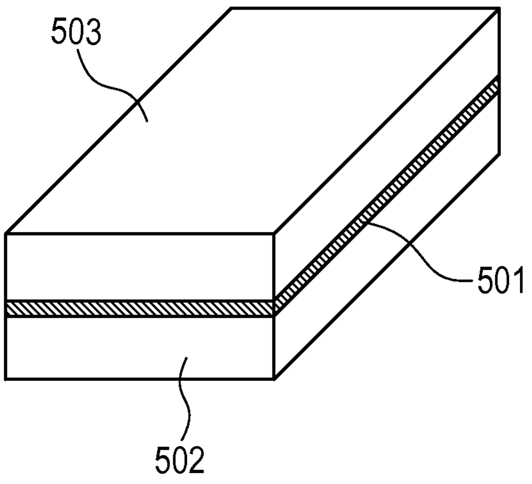
FIG. 5 is an explanatory diagram illustrating an example of the X-ray waveguide of the present invention.

In the figure, a region (1) represented by reference numeral 403 represents such a mode that no X-ray can exist in each of the regions of both the first and second materials in the periodic structure, in other words, is a region corresponding to a condition under which no mode can exist, a region (2) represented by reference numeral 404 represents such a mode that an X-ray can exist only in the region of the first material in the periodic structure, and a region (3) represented by reference numeral 405 represents such a mode that an X-ray can exist in each of the regions of both the first and second materials in the periodic structure. For example, such a structure that a uniform core is interposed between claddings 502 and 503 each formed of the periodic structure formed of the first material and the second material as illustrated in FIG. 5 is considered. In this case, an independent waveguide mode can be formed in the region (1) represented by reference numeral 403 when the real part of the refractive index of the core is larger than the real part of the refractive index of the first material. When the real part of the refractive index of the core is smaller than the electron density of the first material and larger than the real part of the refractive index of the second material, no waveguide mode can be formed in the region (1), but a waveguide mode can be formed in the region (2) represented by reference numeral 404. In particular, when a photonic band gap and the waveguide mode overlap each other on the graph, such a waveguide mode that the X-ray is strongly confined only in the core can be formed. Such waveguide mode as described above can be similarly formed in the region (3) represented by reference numeral 405 when the real part of the refractive index of the core is smaller than the real part of the refractive index of the second material. FIG. 4 illustrates only the photonic band diagram of the cladding for description. For such reasons, an X-ray having a characteristic of a mode that satisfies the dispersion relationship out of the X-rays reflected by multiple interference based on the periodic structure of each of the upper and lower claddings forms a waveguide mode so as to propagate efficiently. As described above, the X-ray waveguide of the present invention guides an X-ray having a photon energy and a wave vector each corresponding to the photonic band gap indicated by the periodic structure of the cladding by confining the X-ray in the core.

Examples of such periodic structure include a mesostructured material produced by a sol-gel process and a three-dimensional woodpile structure produced by a process involving the employment of electron beam lithography. In particular, the propagation loss of an X-ray can be reduced by using such a mesoporous material that air pores formed of air or pores filled with an organic material are periodically arranged two- or three-dimensionally in a host material as the mesostructured material. Examples of such materials include a mesoporous silica, a mesoporous titanium oxide, and a mesoporous tin oxide. The term "host material" refers to a material surrounding pores, for example, in the case where the periodic structure is a mesoporous silica, a mesoporous titanium oxide, or a mesoporous tin oxide, the host materials are silica, titanium oxide, and tin oxide, respectively.

FIG. 5 illustrates an exemplary waveguide structure. In the case where cladding regions are two films such as the case where only the cladding 503 is of a periodic structure and the cladding 502 is a uniform medium, a waveguide can be formed even when only one of the claddings is of a periodic structure. In this case, a waveguide mode satisfies a total reflection condition at an interface between the cladding 502 and the core 501. In many cases, the upper and lower parts of the core are produced by different methods, and hence it may be difficult to produce a periodic structure in each of both the parts, or a periodic structure can be produced only in part of the parts in some cases. Even in any such case, however, a strict condition for total reflection for the formation of a waveguide mode can be entirely alleviated to no small extent. It should be noted that even when a waveguide mode does not satisfy a total reflection condition at an interface between the cladding 502 and the core 501, such a waveguide mode that an X-ray is weakly confined and then propagated exists.

In addition, the use of a two- or three-dimensional periodic structure in a cladding as described above obviates the need for the use of total reflection, and hence limitations on a combination of materials that has been intrinsically essential to total reflection confinement are alleviated. As a result, the selectivity of materials can be improved.

A mesoporous silica material in the present invention has a two- or three-dimensionally regular periodicity. In addition, a general method can be employed as a method of forming the mesoporous silica. For example, a mesoporous silica material having regularity is formed by: forming a polyimide film on an Si substrate; orienting the film by a rubbing treatment involving the use of cotton; and applying a solvent containing a surfactant onto the film by a dip coating method or the like. Such method is, for example, the method described in Japanese Patent Application Laid-Open No. 2005-246369. Further, various materials as well as silica that forms the mesoporous silica can each be used as a material for the periodic structure that forms the cladding. In addition, the inside of each of the pores formed in the mesoporous silica, the pores being regularly arranged so as to form a periodicity, is formed of a gas or a liquid. Examples of such material include air, an organic material, and an inorganic material.

In the X-ray waveguide according to the present invention, Bragg reflection or a photonic band gap effect resulting from the multiple interference of an X-ray in the periodic structure of the cladding is used as a method for confining the X-ray in the core. As a result, a condition limited only by a component, i.e., the total reflection condition at the interface between the core and the cladding can be eliminated, and hence the selectivity of materials for forming the waveguide is improved. In addition, the cladding has a two or more-dimensional periodic structure, and hence the mode and waveguiding direction in the core can be controlled two- or three-dimensionally. As a result, the X-ray can be guided with good efficiency and high quality. In addition, the two or more-dimensional periodic structure entirely contributes to the reflection of an X-ray and the confinement of the X-ray by the reflection, and the selection and formation of a waveguide mode, and hence reductions in propagation characteristics due to individual structure errors can be compensated for. In addition, the waveguide mode, waveguiding direction, and the like of an X-ray can be controlled in an additionally free fashion when the core is patterned into an arbitrary shape as required.

Further, the X-ray waveguide according to the present invention is characterized in that the real part of the refractive index of the material for forming the core is larger than the minimum real part of the refractive index out of the real parts of the refractive index of the multiple materials for forming the cladding.

Especially when such a waveguide mode that the electric field or magnetic field intensity of an X-ray converges on a material having the maximum real part of the refractive index out of the materials that form the core of the X-ray waveguide of the present invention is used, the real part of the refractive index of the material is preferably larger than the real part of the refractive index of all the materials that form the cladding. With such configuration, the X-ray can be very strongly confined because the waveguide mode is formed at lower frequencies than all light lines in the photonic band diagram of the system are, as the region (1) in FIG. 4.

In addition, the fact that the real part of the refractive index of a material that forms the core is maximum generally means that the electron density of the material is minimum in the system. Accordingly, the imaginary part of the refractive index β' related to absorption and proportional to the electron density can also be reduced, and hence an X-ray can be guided with a low loss.

Example 1

In the present invention, the waveguiding direction of an X-ray to be guided is parallel to a z-axis in each figure in each of all examples. In other words, a wave vector equivalent to the propagation constant of a waveguide mode is identical in direction to the z-axis. Example 1 of the present invention is described with reference to FIGS. 1A and 1B. The X-ray waveguide illustrated in FIGS. 1A and 1B is obtained by sandwiching the core with claddings 105, which are each a mesoporous silica film formed on a Si substrate 101 and having a thickness of about 300 nm, so that a core 104 formed of polymethyl methacrylate (PMMA) may be interposed between the claddings.

Each of the claddings 105 as the mesoporous silica films is such that pores 103 of a surfactant as an organic material, the pores elongating in a z direction in FIGS. 1A and 1B and each having a radius of about 2 nm, form a triangular lattice periodic structure in $SiO_2$ 102 in an x-y plane. The period is about 5 nm, and as a characteristic of the periodic structure suggests, an x direction is a Γ-K direction and a y direction is a Γ-M direction. The claddings 105 as the mesoporous silica films each have a Bragg angle of about 1° for an X-ray having a wave vector parallel to a y-z plane and a wavelength of about 0.1 nm (1 Å). In other words, the X-ray having the wave vector parallel to the y-z plane and a wavelength of about 0.1 nm (1 Å), which is incident on the surface of each of the claddings 105 as the mesoporous silica films at an incidence angle of about 1°, is reflected at a reflection angle of about 1°. Here, the term "incidence angle" refers to an angle formed between the wave vector of the X-ray incident in the y-z plane and the z axis, and the term "output angle" refers to an angle formed between the wave vector of the X-ray reflected at the surface of each of the claddings 105 as the mesoporous silica films in the y-z plane and the z axis. The mesoporous silica films of the claddings are each formed of two different materials having real part of the refractive index of about 0.9999979714 and 1.

In this example, such an X-ray that an angle formed between a wave vector parallel to the y-z plane and the z axis in the core coincides with a Bragg angle forms a mode because the claddings 105 as the mesoporous silica films are vertically provided in a y axis direction with the core interposed between the claddings. In this example, the thickness of the core 104 is about 50 nm, and the waveguide mode of an X-ray that propagates in the core is a multimode. Now that the claddings 105 as the mesoporous silica films are each of a two-dimensional periodic structure, the waveguide mode actually has a two-dimensional electric field distribution in the x-y plane. Accordingly, this example enables the formation of a two-dimensionally controlled waveguide mode and the guiding of an X-ray with such mode.

Example 2

Figure 6:
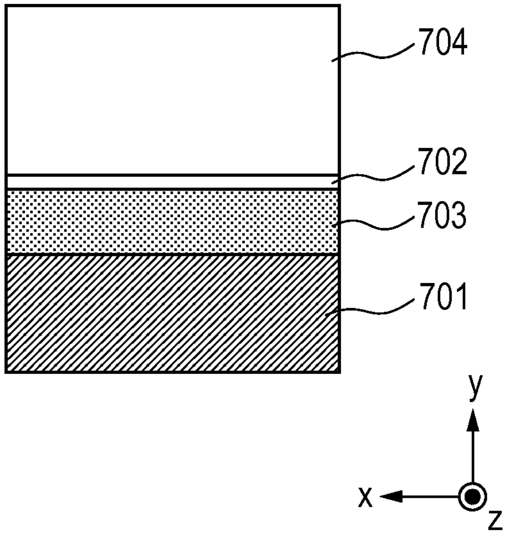
FIG. 6 is an explanatory diagram illustrating an X-ray waveguide of Example 2 of the present invention.

FIG. 6 is a view illustrating Example 2 of the present invention. An X-ray waveguide of FIG. 6 is of the following shape. A cladding 703 is provided on an Si substrate 701, a core 702 is provided on the cladding 703, and further, a cladding 704 is provided on the core 702. In addition, the core 702 is interposed between the two claddings 703 and 704. The core is, for example, air. The cladding 703 is of the so-called artificial opal structure where polystyrene spheres each having a diameter of about 50 nm are arranged into a hexagonal close-packed structure in a self-organizing fashion on the substrate, and is of a three-dimensional periodic structure. The cladding 704 is formed of Ni. The Ni film of the cladding 704 has a real part of the refractive index of about 0.9999877410 for an X-ray having a photon energy of about 12 keV. In addition, the cladding 703 is formed of the styrene spheres each having a real part of the refractive index of about 0.9999965852 and polymethyl methacrylate (PMMA) having a real part of the refractive index of about 9.9999814617854.

The structure has a Bragg angle of about 0.08° for an X-ray having a wavelength of about 0.1 nm (1 Å). The core 702 is a polymethyl methacrylate (PMMA) resin film formed on the Si substrate and having a thickness of about 50 nm, and a z-axis between the core 702 and the upper cladding 704 is larger than 0.1°. Accordingly, the Bragg angle at the lower cladding 703 is smaller than the z-axis. In other words, the waveguide mode of an X-ray formed in the core is confined in the core by total reflection at the interface with the upper cladding 704 and by Bragg reflection at the lower cladding 703.

Example 3

Figure 7:
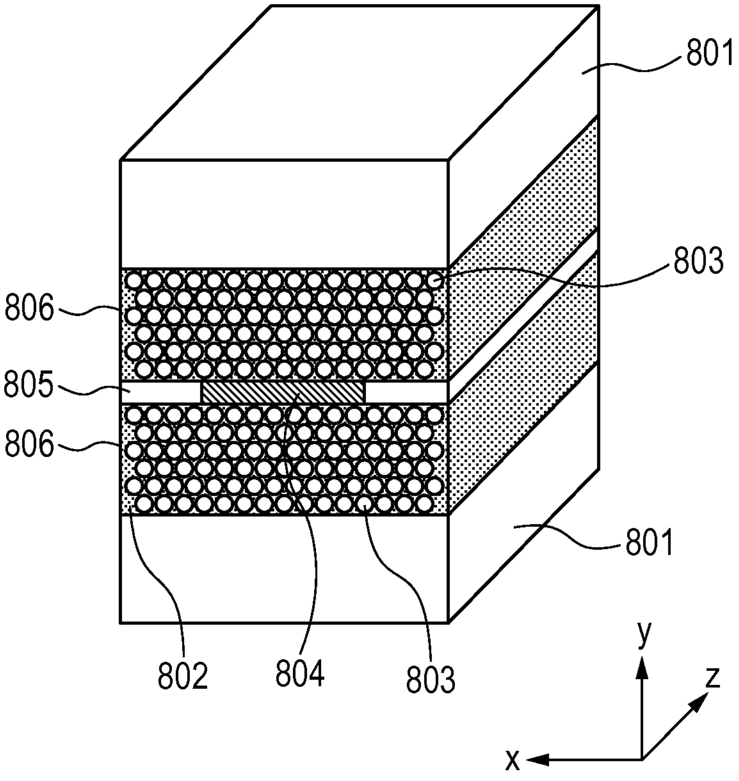
FIG. 7 is an explanatory diagram illustrating an X-ray waveguide of Example 3 of the present invention.

FIG. 7 is a view illustrating Example 3 of the present invention. In this example, the core of the X-ray waveguide described in Example 1 is of a structure patterned in a two-dimensional plane, and the configuration except a core 804 and a spacer 805 is the same as that of Example 1.

In this example, in a forming process for the core, Ti 805 is formed on a mesoporous silica 806 as one cladding by sputtering so as to have a thickness of 50 nm, and then the core 804 having a width of about 200 nm and formed of air is formed by electron beam lithography and etching. Further, the mesoporous silica 806 produced on an Si substrate 801 is stuck onto the core. The mesoporous silica 806 is such that pores 803 of a surfactant as an organic material, the pores elongating in a z direction in FIG. 7 and each having a radius of about 2 nm, form a triangular lattice-like periodic structure in $SiO_2$ 802 in an x-y plane. As the core is patterned in the two-dimensional plane, an X-ray in the core is reflected at an interface with the spacer, and its waveguide mode is specified even in a direction parallel to a substrate surface. As a result, a three-dimensionally controlled waveguide mode can be formed. The core is formed of two materials, i.e., silica having a real part of the refractive index of about 0.9999979714 for an X-ray having a photon energy of about 12 keV and air having a real part of the refractive index of about 1 for the X-ray.

Example 4

Figure 3:
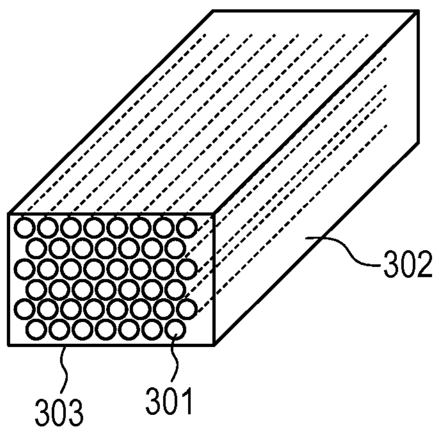
FIG. 3 is a diagram illustrating a mesoporous silica.
Figure 8:
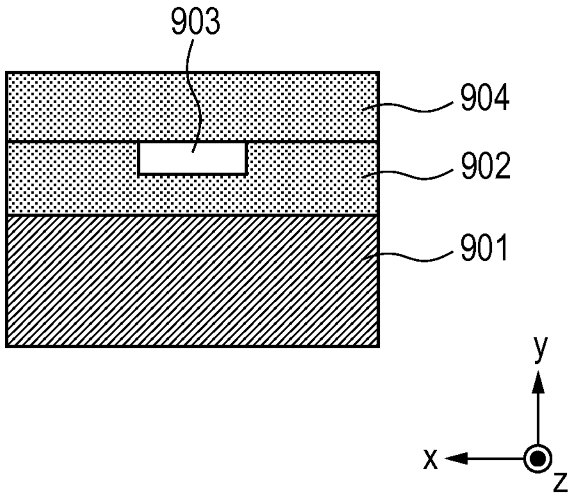
FIG. 8 is an explanatory diagram illustrating an X-ray waveguide of Example 4 of the present invention.

FIG. 8 is a view illustrating Example 4 of the present invention. A waveguide of this example has the following structure. A cladding 902 as a mesoporous silica film of the same two-dimensional periodic structure as that of the mesoporous silica 303 illustrated in FIG. 3 is stuck onto an Si substrate 901, and a cladding 904 as a similar mesoporous silica film is stuck to the cladding 902. In the waveguide of this example, a part obtained by patterning part of the cladding 902 as a mesoporous silica material is a core 903. The mesoporous silica films of the claddings are each formed of silica having a real part of the refractive index of about 0.9999979714 and air having a real part of the refractive index of about 1.

The core 903 is formed of air, and is obtained by patterning the cladding 902 by photolithography and etching steps. The core 903 is a rectangular waveguide having a depth of about 100 nm and a width of about 1 μm. In this example, the core 903 is surrounded with the mesoporous silica materials each having a two-dimensional periodic structure in all directions in an x-y plane. As a result, an X-ray can be confined by the periodic structure in a direction in the x-y plane, and its waveguide mode is also controlled in the two-dimensional plane. In particular, when the core 903 is formed of air, a loss in association with propagation can be suppressed to the minimum.

INDUSTRIAL APPLICABILITY

The X-ray waveguide of the present invention can be utilized in the field of an X-ray optical technology such as an X-ray optical system for operating an X-ray output from, for example, a synchrotron, or a part for use in an X-ray optical system for an X-ray imaging technology, an X-ray exposure technology, or the like.

This application claims the benefit of Japanese Patent Application Nos. 2010-127337, filed Jun. 2, 2010, and 2011-101308, filed Apr. 28, 2011, which are hereby incorporated by reference herein in their entirety.

What is claimed is:

1. An X-ray waveguide, comprising:

a core, of a first material, for guiding X-rays in such a wavelength band that a real part of the refractive index of said first material is 1 or less; and a cladding for confining the X-rays in said core, wherein said cladding has a periodic structure in which multiple materials, real parts of whose refractive indices are different from each other, are periodically arranged in two-dimensional directions perpendicular to the guiding direction of X-rays, and said periodic structure has a period of 100 nm or less, wherein said periodic structure includes a mesostructured material formed of said multiple materials.

2. The X-ray waveguide according to claim 1, wherein said periodic structure includes a mesoporous material formed of said multiple materials.

3. The X-ray waveguide according to claim 1, wherein said periodic structure is obtained by arranging spheres in one of a two-dimensional fashion and a three-dimensional fashion in said first material.

4. The X-ray waveguide according to claim 1, wherein the real part of the refractive index of said first material of said core is larger than a minimum real part of the refractive index out of the real parts of the refractive indices of said multiple materials of said cladding.

5. An X-ray waveguide, comprising:

a core for guiding X-rays; and two claddings for confining the X-rays in said core, wherein at least one of said claddings comprises mesostructure including (a) a host material having pores formed therein, and (b) materials having a different refractive index from that of said host material in said pores, and said pores are periodically arranged in two- or three-dimensional directions with a period of 100 nm or less.

6. The X-ray waveguide according to claim 5, wherein said pores are spherical.

7. The X-ray waveguide according to claim 5, wherein said pores are cylindrical.

8. The X-ray waveguide according to claim 5, wherein at least one of said materials having a different refractive index from that of said host material comprises air.

9. The X-ray waveguide according to claim 5, wherein at least one of said materials having a different refractive index from that of said host material comprises an organic material.

10. The X-ray waveguide according to claim 5, wherein said pores are periodically arranged in a triangular lattice fashion or hexagonal close-packed fashion.

11. The X-ray waveguide according to claim 5, wherein said pores are periodically arranged with a period of 10 nm or more.

* * * * *